United States Patent [19]

Belart

[11] Patent Number: 4,462,300

[45] Date of Patent: Jul. 31, 1984

[54] HYDRAULIC POWER BOOSTER WITH A MECHANICALLY OPERATED SEPARATE BRAKE CONTROL VALVE MEMBER

[75] Inventor: Juan Belart, Walldorf, Fed. Rep. of Germany

[73] Assignee: ITT Industries, Inc., New York, N.Y.

[21] Appl. No.: 398,475

[22] Filed: Jul. 15, 1982

[30] Foreign Application Priority Data

Sep. 17, 1981 [DE] Fed. Rep. of Germany ....... 3136975

[51] Int. Cl.$^3$ .......................... F15B 9/10; F15B 13/10
[52] U.S. Cl. .................. 91/384; 91/391 R; 92/128; 60/547.1; 60/551
[58] Field of Search ............. 91/391 R, 384; 60/547.1, 548, 551; 92/128; 137/315

[56] References Cited

U.S. PATENT DOCUMENTS

| | | | |
|---|---|---|---|
| 3,805,671 | 4/1974 | Carre | 91/391 R |
| 3,838,629 | 10/1974 | Meyers | 91/391 R |
| 3,855,797 | 12/1974 | Papiau | 60/547.1 |
| 4,050,251 | 9/1977 | Carre et al. | 91/391 R |
| 4,121,500 | 10/1978 | Carre et al. | 91/391 R |

*Primary Examiner*—Paul E. Maslousky
*Attorney, Agent, or Firm*—James B. Raden; Marvin M. Chaban

[57] ABSTRACT

A hydraulic power booster arrangement includes a brake valve which is arranged substantially in parallel to a booster piston and which is operative for controlling the connection from a pressure chamber to a auxiliary pressure source or to an unpressurized return reservoir. To control the movement of the brake valve, there is provided a multipart lever actuation mechanism including a support lever and at least one control lever which are pivotally connected to one another intermediate their respective ends. One end of the support lever is pivotally mounted on a retaining member which is rigidly connectible to the power booster housing. The housing is provided with a mounting hole through which the lever actuation mechanism is adapted to be inserted into the pressure chamber and which is adapted to be closed by the retaining member.

19 Claims, 5 Drawing Figures

HYDRAULIC POWER BOOSTER WITH A MECHANICALLY OPERATED SEPARATE BRAKE CONTROL VALVE MEMBER

BACKGROUND OF THE INVENTION

The present invention relates to a hydraulic power booster arrangement, in particular for actuation of master cylinders in vehicular brake systems.

There are already known arrangements of this type, wherein two cylinder bores arranged substantially in parallel in a housing terminate in a pressure chamber, wherein a booster piston is guided in the first cylinder bore while a brake valve is inserted in the second cylinder bore for the control of pressure fluid communications from the pressure chamber to a pressure source or to an unpressurized return reservoir, wherein a multipart lever actuation mechanism is provided to govern the brake valve, such mechanism having a first lever which is stationarily supported in the housing and tiltable by a pedal-actuatable push rod or similar operating element and having a second lever which is supported rotatably at the first lever and bears against the booster piston and the brake valve.

A hydraulic booster imcorporating the features mentioned hereinabove is known from German patent specification No. 15 80 690, wherein the first lever is of U-shaped design and its bending point is placed in the area of the point of support at the push rod. The first lever is bifurcated in the area of its bending point so that a bolt extending normal to the actuating direction and mounted at the push rod is guided in the slot slidably in longitudinal direction. The open ends of the first lever are stationarily supported on the housing by means of a screw inserted laterally into the housing. Arranged between the legs of the U-shaped lever is a second lever which engages the brake valve, on the one hand, and the booster piston, on the other hand. The two levers are pivotally interconnected approximately at their central regions.

In response to an actuating force acting on it, the push rod and the bolt connected therewith will first perform a short travel during which the first lever is tilted in one direction about its stationary point of support. Simultaneously, also the connecting point between the levers will tilt. Since the actuating forces of the booster piston are substantially greater than the control forces of the brake valve, this tilting movement has as a consequence that the second lever is angularly displaced in the opposite sense relative to the first lever and actuates the brake valve. Now, pressure fluid is introduced through the brake valve into the pressure chamber, resulting in displacement of the booster piston in the actuating direction. This displacement causes the second lever to turn back until the relative position which prevailed prior to the actuating has be reestablished between the levers. Upon discontinuance of the actuating force, the relative motions described above will be reversed until the inactive position is established again in which the pressure chamber communicates with the unpressurized return reservoir.

A particular disadvantage of the just described hydraulic power booster arrangement is that the assembly of the lever actuation mechanism requires great effort. First, it is necessary to put the U-like bent lever around the push rod while making sure that the bolt formed at the push rod slides into the guiding slot provided for it. Then the free ends of the U-shaped levers have to be secured by the screw extending laterally into the pressure chamber. During this process, there is only a very limited access from the outside to the free ends of the U-shaped lever so that the assembling operation will take a relatively high amount of time whereby the total of manufacturing costs is increased.

SUMMARY OF THE INVENTION

Accordingly, it is a general object of the present invention to avoid the disadvantages of the prior art.

More particularly, it is an object of the invention to develop a hydraulic power booster arrangement, particularly for use in actuating master cylinder units in vehicle braking systems, which does not possess the disadvantages of the conventional arrangements of this type.

Another object of the present invention is to so construct the arrangement of the type here under consideration as to reduce the time required for assembling the same, as compared to that consumed in assembling the conventional arrangements.

It is yet another object of the present invention to provide an arrangement of the above type which is simple in construction, inexpensive to manufacture and assemble, and reliable in operation nevertheless.

In pursuance of these objects and others which will become apparent hereafter, one feature of the present invention resides in a hydraulic power booster arrangement for use in conjunction with an auxiliary source of pressurized hydraulic fluid and with an unpressurized reservoir, particularly in vehicle braking systems for actuating master cylinder units, comprising a housing defining a pressure chamber and two substantially parallel bores which open into the pressure chamber; an operating element mounted on the housing for movement between a rest position and a plurality of braking positions and extending into the pressure chamber; a booster piston received in one of the bores for axial displacement therein; a brake control valve member received in the other bore for axial movement therein between a first and a second position in which it establishes communication of the pressure chamber with the reservoir and with the auxiliary source, respectively; a multipart lever actuation mechanism for moving the valve member in dependence on the position of the operating element, including at least one support lever having two spaced ends, and at least one control lever having a mounting portion pivotally mounted on the support lever between its ends, and first and second end portions extending from the mounting portion; and means for so mounting the actuation mechanism on the housing that one of the ends of the support lever engages the operating element and the first and second end portions of the control lever respectively engage the booster piston and the valve member, including means for bounding a through opening in the housing leading into the pressure chamber and having such dimensions as to permit insertion of the actuation mechanism therethrough, a retaining member sealingly and stationarily mounted in the opening of the housing at the conclusion of the inserting operation, and means for pivotally supporting the other end of the support lever on the retaining member.

The assembly of a lever actuation mechanism of this design will be performed, for example, by initially providing the pivotable connection between the levers outside the pressure chamber. Then, the other end of the first or support lever, which has to be stationarily supported in the housing, will be articualted to the retaining member. The lever actuation mechanism preassembled in this manner may now be advantageously inserted through the opening provided for this purpose in the housing into the pressure chamber of the hydraulic power booster arrangement. In this arrangement, the housing and the retaining member are so connected to one another that the opening can be pressure-tightly closed by the retaining member and that, in the closed state, the point of support between the retaining member and the first lever is situated at the desired location. Thus, this inventive design of the lever actuation mechanism ensures a considerable reduction in assembling effort.

Various different solutions are possible in principle to connect the first lever to the retaining member. It will be particularly advantageous when the connection between the retaining member and the first lever is a ball joint. Further, it will be advantageous when the retaining member is adapted to be threaded into the mounting hole and when the end of the retaining member that projects into the pressure chamber is designed as a joint seat and the end of the first lever as a spherical joint part. In this case, the ball joint will permit threading of the retaining member into the opening after the preassembled lever actuation mechanism has been inserted, without any appreciable torque being exerted on the first lever, so that the lever actuation mechanism disposed in the pressure chamber will maintain its position unchanged.

Furthermore, it will be advantageous for the well-defined fixation of the lever actuation mechanism in the booster chamber to connect the second lever to the retaining member by a bolt or a terminated pivot and to secure the position of the retaining member by a screw element, while the pressure chamber is sealed relative to atmosphere, in such a manner that the axis of the bolt is located normal to the actuating direction. Such a design will accomplish in an expedient fashion that the retaining member is connected to the first lever by means of a simple bolt or pivot coupling which usually involves lower costs than a ball joint coupling.

When the end of the retaining member close to the screw element is of plate-like configuration and is supported on projections provided at the mounting opening there results the advantage that no torque at all is exerted on the first lever when the retaining member is secured by the screw element, so that the lever mechanism always maintains its designated position.

To define the position of the lever actuation mechanism in the pressure chamber still more reliably, the mounting hole can be provided with one or with several cams or projections which are adapted to engage recesses in the plate-shaped area of the retaining member. With such a design, there is no need to take additional steps to assure that the lever actuation mechanism adopts the correct position in the pressure chamber as soon as the cams at the mounting hole engage the recesses in the plate-shaped area of the retaining member. Besides, it will be ensured by this expedient that no twisting or angular displacement of the lever actuation mechanism takes place when the screw element is threaded in, since the torques transmitted to the plate-shaped area of the retaining member are received and opposed by the cams at the mounting opening. The otherwise present necessity to check the position of the lever actuation mechanism being avoided, there results a still further simplification of the assembly and a still further cost reduction.

The bolt coupling between the retaining member and the first lever can be attained by design arrangements, for instance, in that the end of the retaining member extending into the pressure chamber engages in an axial notch or recess of the first lever.

Another advantageous construction of the lever actuation mechanism will be obtained when one second or control lever is pivotally mounted on each of the opposite sides of the first lever. The lever actuation mechanism of this construction guarantees that the forces acting upon the push rod will be transmitted without causing angular displacement of the connecting axis between the levers. When the second levers are in surface contact with the first lever in the area of the point of support at the latter, the levers assume a defined position relative to one another, without the friction forces developing between the first lever and the second lever when angularly displaced relative to each other being of any appreciable amount.

It will be, furthermore, advantageous with respect to ease of assembly of the hydraulic booster that the end of the retaining member and of the screw element remote from the pressure chamber is provided with a non-circular, especially hexagonal, recess. Such a design will afford the further advantage of the retaining member or the screw element being able to be threaded into the mounting opening so far that it terminates flush with the outer surface of the housing.

Moreover, a still further simplification of the assembly will be ensured in that the push rod includes a recess open toward the stationary point of support, this recess receiving the end of the first lever which is remote from the stationary point of support. In this embodiment, there is no need for the bolt or pivot coupling between the push rod and the one end of the first lever, which is required in the conventional construction.

A bolt coupling between the second lever and the booster piston may be advantageously dispensed with, when the booster piston includes a recess which is open toward the stationary point of support and into which the end of the second lever remote from the stationary point of support is adapted to be inserted.

Another arrangement for simplification of the assembly will be realized in that the ends of the recesses which are close to the stationary point of support are expanded by inclined surfaces. When inserting the lever actuation mechanism, there will result a guiding action which, on the one hand, eliminates to a large degree the risk of an incorrect assembly or insertion of the lever actuation mechanism, while, on the other hand, it overcomes the necessity for taking special care during the assembly, so that still less time is needed for the assembly.

Finally, it will be particularly advantageous when the areas of all levers which are moved into contact with the booster piston and with the push rod are circularly rounded, since the effective lever lengths in relation to the bolt then are either substantially equal in any position of the lever actuation mechanism or always change in the same ratio. This results in a situation where the actuation force exerted on the push rod will be always transmitted to the brake valve in the same ratio.

BRIEF DESCRIPTION OF THE DRAWING

Above mentioned and other features and objects of this invention will become more apparent by reference to the following description taken in conjunction with the accompanying drawing, in which.

DETAILED DESCRIPTION OF THE PREFERRED EMBODIMENTS

Figure 1:
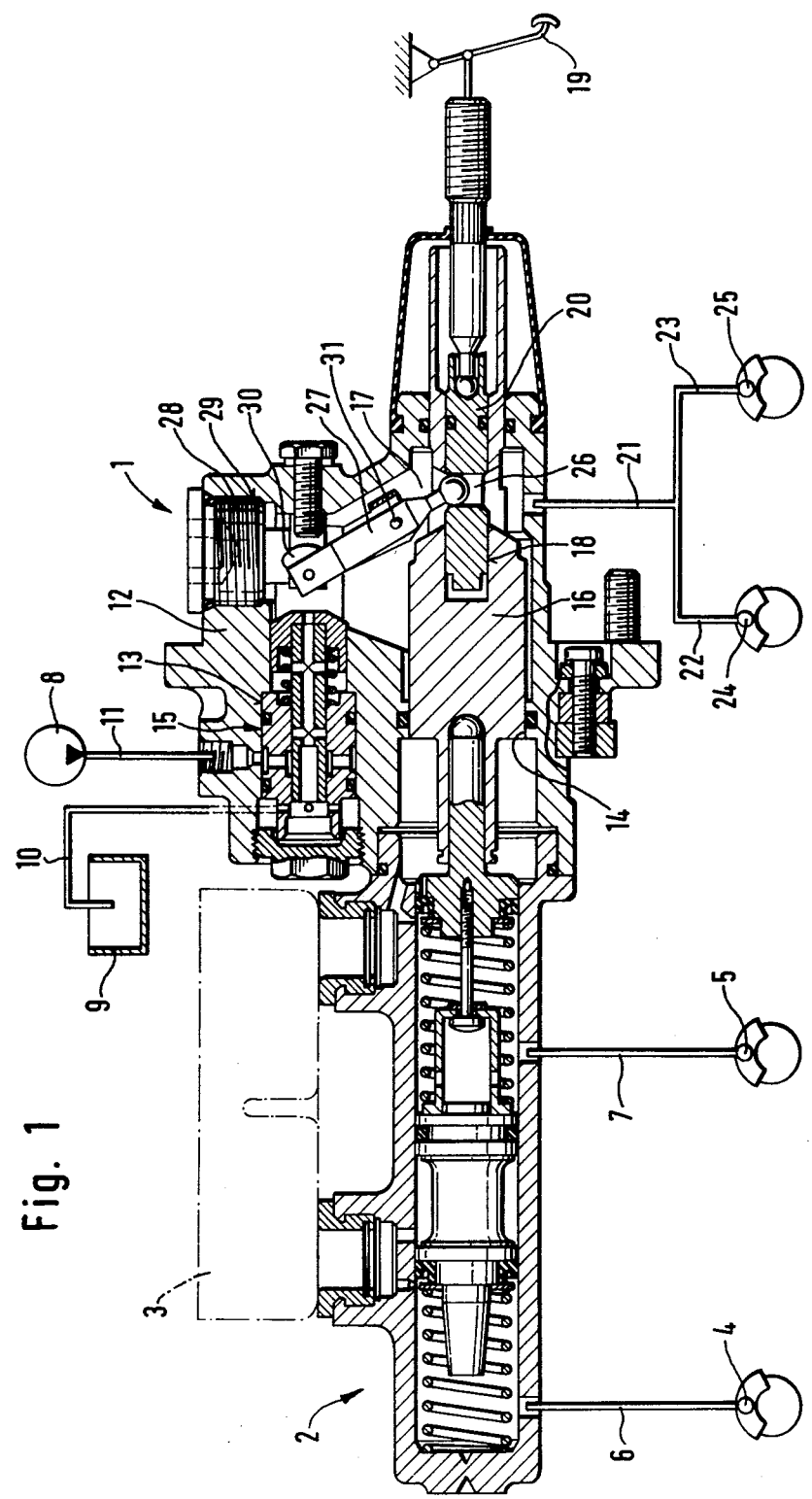
FIG. 1 is an axial sectional view of a hydraulic power booster arrangement of the present invention as integrated in a vehicle braking system.

Referring now to the drawing in detail, and first to FIG. 1 thereof, it may be seen that the reference numeral 1 identifies a hydraulic power booster and the reference numeral 2 a tandem master cylinder of conventional construction actuatable by the power booster 1. A supply reservoir 3 is attached to the tandem master cylinder 2. Two wheel brakes 4, 5 are actuatable by the tandem master cylinder 2 via pressure conduits 6, 7. An auxiliary pressure source 8 which may include a hydraulic pump and pressure accumulator, serves for the supply of pressurized hydraulic fluid to the hydraulic power booster 1, while a return reservoir 9 serves for its discharge. The auxiliary source 8 and the return reservoir 9 communicate via pressure conduits 10, 11 with the hydraulic power booster 1.

A housing 12 of the hydraulic power booster 1 is provided with two cylinder bores 13, 14 arranged in parallel to one another, the cylinder bore 13 thereof receiving a brake valve 15 while the cylinder bore 14 receives a booster piston 16. Those ends of the brake valve 15 as well as the booster piston 16 which are remote from the tandem master cylinder 2 project into a pressure chamber 17 which is alternatively connectible through the brake valve 15 either to the auxiliary source 8 or to the unpressurized return reservoir 9. The end surface of the booster piston 16 close to the pressure chamber 17 includes a blind bore 18. One end of an operating element or push rod 20 which is actuatable by a brake pedal 19 is guided in the bore 18. The pressure chamber 17 of the hydraulic power booster 1 is in communication with two further wheel brakes 25, 25 via pressure conduits 21, 22, 23.

The end of the push rod 20 projecting into the pressure chamber 17 is provided with a recess 26 in which there is guided one end of a first or support lever 27. This one end of the first lever 27 is, for example, of spherical shape, which enables a sliding movement of the one lever end in the recess 26. The other end of the first lever 27 is tiltably mounted on the housing 12 by means of a retaining member 28. The housing 12 further includes a mounting hole or opening 29 through which the lever actuation mechanism can be inserted into the pressure chamber 17 and which is adapted to be closed by the retaining member 28. A second or control lever 30 which engages the brake valve 15, on the one hand, and the booster piston 16, on the other hand, is guided substantially in parallel to the first lever 27. The two levers 27, 30 are supported for pivoting relative to each other by a bolt or pivot 31.

Assembly of the lever mechanism 27, 30 with the hydraulic power booster 1 will be effected in such a manner that first the pivotable coupling between the levers 17 and 30 is established outside the pressure chamber 17 by mounting the bolt 31. Subsequently, the first lever 27 is articulately connected to the retaining member 28. This preassembled unit or actuation mechanism comprising the retaining member 28, the first lever 27 and the second lever 30 will now be inserted through the mounting hole 29 into the pressure chamber 17, the spherical end of the first lever 27 sliding into the recess 26 of the push rod 20. In a following assembling operation, the retaining member 28 is connected to the housing 12 in a manner providing a pressure-tight or sealed closure of the mounting hole 29. With the retaining member 28 located in this manner, the levers 27, 30 simultaneously adopt a defined position in the pressure chamber 17.

Figure 2:
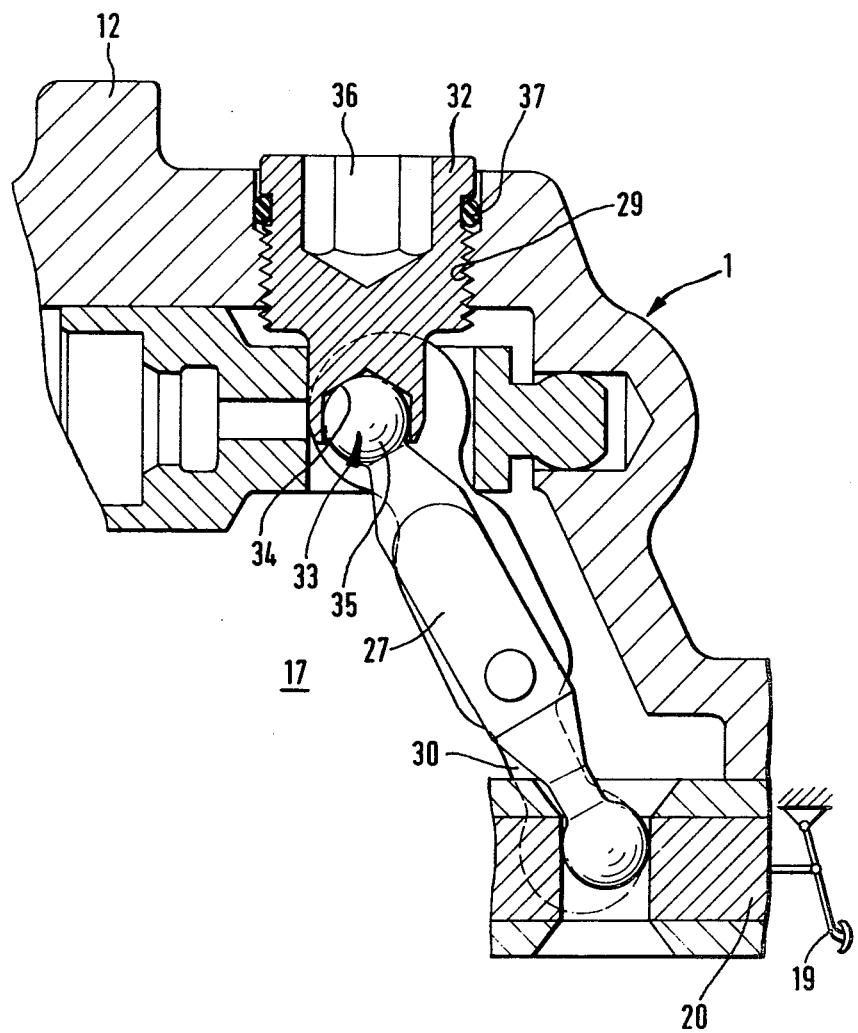
FIG. 2 is an enlarged axial sectional view of a detail of FIG. 1 with structural modifications.

In the partial sectional view illustrated in FIG. 2, particular attention is to be directed to the special coupling between a retaining member 32 and the first lever 27. This coupling is designed as a ball joint 33. The retaining member 32 is essentially constituted by a screw adapted to be threaded into the mounting hole 29. This screw 32 is cylindrically necked-down at its end projecting into the pressure chamber 17 and provided with a joint seat socket 34. The end of the first lever 27 which is remote from the push rod 20 is shaped as a spherical joint part or ball 35. The end of the retaining member 32 remote from the pressure chamber 17 is provided with a hexagonal recess 36. To improve the sealing of the pressure chamber 17 relative to the atmosphere, a sealing ring 37 is interposed between the retaining member 32 and the housing 12.

In the embodiment illustrated in FIG. 2, the unit comprising the first lever 27 and the second lever 30 is again pre-assembled outside the pressure chamber 17 and connected to the retaining member 32. The levers 27, 30 will be inserted through the mounting hole 29 into the pressure chamber. The mounting hole 29 and the retaining member 32 are threaded, thus enabling the retaining member 32 to be threaded into the housing 12. The joint seat 34 and the spherical joint part 35 of the ball joint 33 are conformed one to the other with respect to dimensions in such a manner that no appreciable torques will be transmitted onto the lever 27 during this threading movement. The sealing ring 37 serves to better seal the pressure chamber 17 relative to atmosphere. The threading of the retaining member 32 is facilitated by the presence of the hexagonal recess 32 at the end face of the retaining member 32 that faces away from the pressure chamber 17.

Figure 3:
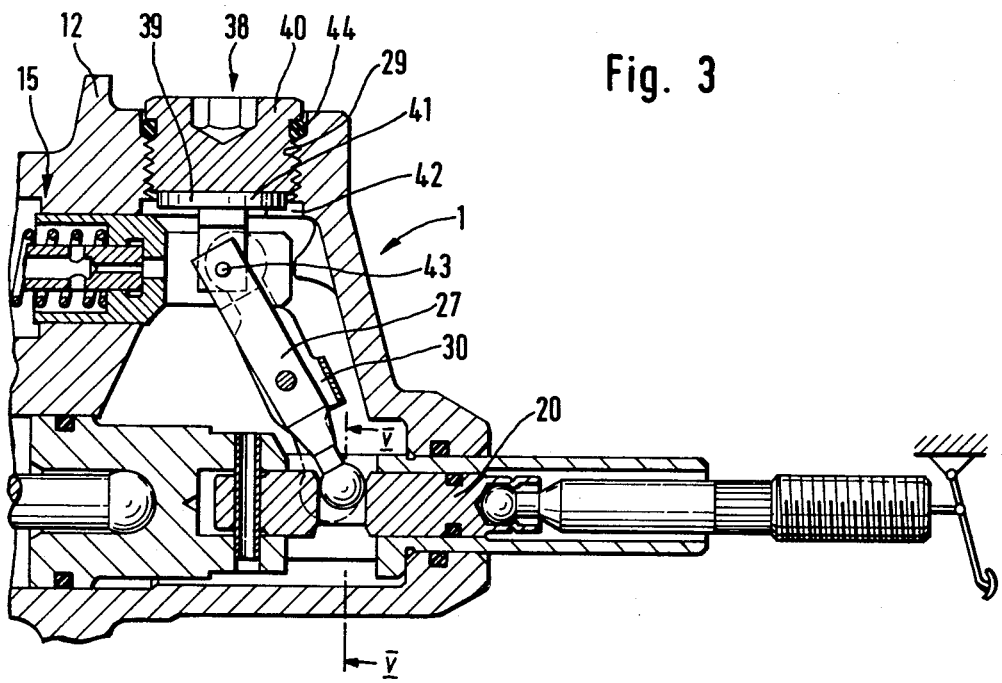
FIG. 3 is an axial sectional view of the detail shown in FIG. 2 but with further structural modifications.

In the construction illustrated in FIG. 3, a retaining member 38 is provided which is of a bipartite design and is substantially composed of a retaining part 39 and a screw element 40. The retaining part 39 includes a plate-like portion 41 which is in engagement with projections 42 protruding into the mounting hole 29. The second lever 27 and the retaining part 39 are pivotally connected by a bolt or pivot 43. Axial fixation of the retaining part 39 is performed by threading the screw element 40 in, with a sealing ring 44 being employed.

Figure 4:
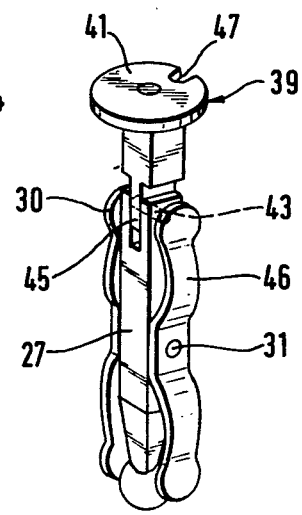
FIG. 4 is a perspective view of a lever actuation mechanism corresponding to that depicted in FIG. 3.

FIG. 4 shows a perspective view of the assembled lever actuating mechanism used in the hydraulic power booster 1 according to FIG. 3. It can be seen that the end of the retaining part 39 remote from the plate-like portion 41 is necked down and ends in a lug 45. The first lever 27 is bifurcated in a corresponding fashion and receives the lug 45 of the retaining part 34. A bolt 43 achieves articulation between the retaining part 39 and the first lever 27. In addition to the second or control lever 30, another control lever 46 is arranged on the other side of the first lever 27. The control levers 30, 46 have equal dimensions in the illustrated construction and move into surface contact with the first lever 27 in the area of the bolt 31. The platelike portion 41 of the retaining part 39 is provided with a radially inwardly extending recess 47 which receives a cam in the mounting hole 29 of the hydraulic power booster 1 when the retaining part 39 is introduced.

Figure 5:
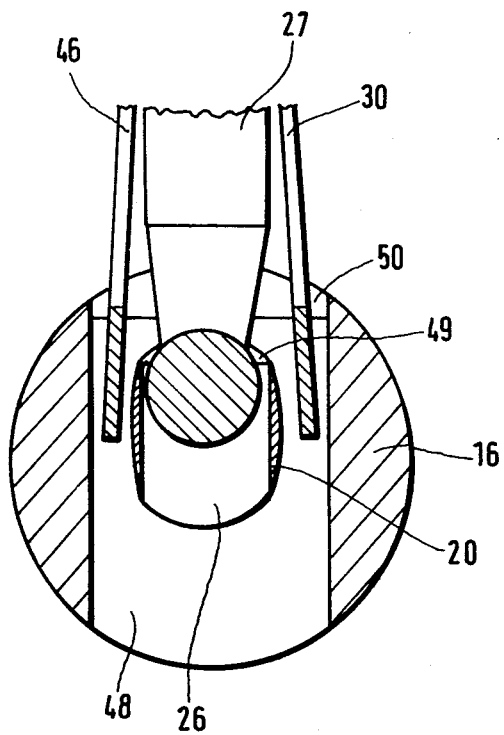
FIG. 5 is a cross-sectional view taken along line V—V of FIG. 3.

FIG. 5 shows in particular the area of support of the first lever 27 on the push rod 20 and the area of support of the control levers 30, 46 on the booster piston 16. It can be seen that the spherically designed end of the first lever 27 is radially insertable into the recess 26 of the push rod 20 and is displaced in the recess 26 upon axial movements of the push rod 20. At least the surfaces axially bounding the recess 26 conform to the dimensions of the spherical end of the first lever 27 by being oversized to a relatively small extent so that a tilting movement of the first lever 27 will commence in response to only a slight axial displacement of the push rod 20.

The ends of the levers 30, 46 are arranged at the respective sides of the piston rod 20. The levers 30, 46 engage in a recess 48 of the booster piston 16 and are in abutment with the booster piston 16 under all operating conditions. Both the recess 26 of the push rod 20 and the recess 48 of the booster piston 16 include inclinations 49, 50 at their ends that are open toward the stationary point of support, these inclinations 49, 50 expanding the recesses 26, 48 in the areas of concern and resulting in a further simplification of the assembling operation by guiding the respective ends of the levers 27, 30 and 46 into the associated recesses 26 and 48.

While I have described above the principles of my invention in connection with specific apparatus, it is to be clearly understood that this description is made only by way of example and not as a limitation to the scope of my invention as set forth in the accompanying claims.

I claim:

1. A hydraulic power booster arrangement for use in conjunction with an auxiliary source of pressurized hydraulic fluid and with an unpressurized reservoir, particularly in vehicle braking systems for actuating master cylinder units, comprising:
   a housing defining a pressure chamber and two substantially parallel bores which open into said pressure chamber;
   an operating element mounted on said housing for movement between a rest position and a plurality of braking positions and extending into said pressure chamber;
   a booster piston received in one of said bores for axial displacement therein;
   a brake control valve member received in the other of said bores for axial movement therein between a first and a second position in which it establishes communication of said pressure chamber with the reservior and with the auxiliary source, respectively;
   a multipart lever actuation mechanism for moving said valve member in dependence on the position of said operating element, including
   at least one support lever having two spaced ends and
   at least one control lever having a mounting portion pivotally mounted on said said support lever between said ends thereof, and first and second end portions extending from said mounting portion; and
   means for so mounting said actuation mechanism on said housing that one of said ends of said support lever engages said operating element and said first and second end portions of said control lever respectively engage said booster piston and said valve member, including
   means for bounding a through opening in said housing leading into said pressure chamber and having such dimensions as to permit insertion of said actuation mechanism therethrough,
   a retaining member sealingly and stationarily mounted in said opening of said housing at the conclusion of the inserting operation, and
   means for pivotally supporting the other of said ends of said support lever on said retaining member.

2. The arrangement as defined in claim 1, wherein said pivotally supporting means includes a ball joint.

3. The arrangement as defined in claim 2, wherein said ball joint includes a spherical formation on said other end of said support lever, and a shape-correlated socket on said retaining member.

4. The arrangement as defined in claim 1, wherein said bounding means forms an internal thread in said opening; and wherein said retaining member has an external thread meshing with said internal thread upon insertion.

5. The arrangement as defined in claim 1, wherein said pivotally supporting means includes a pivot mounting said support lever on said retaining member for pivoting about a pivot axis; and wherein said retaining member assumes such position relative to said housing when mounted thereon that said pivot axis extends in a plane substantially normal to the axis of said bores.

6. The arrangement as defined in claim 5, wherein said bounding means forms an internal thread in said opening; and wherein said retaining member includes a first part having an external thread meshing with said internal thread upon insertion, and a second part mounted on said first part for relative angular displacement about an axis extending along the axis of said external thread and supporting said pivot.

7. The arrangements as defined in claim 6, wherein said second part has a substantially disc-shaped configuration.

8. The arrangement as defined in claim 6; and further comprising means on said housing at said opening for holding said second part against angular displacement with said first part during the threading of the latter into said opening.

9. The arrangement as defined in claim 8, wherein said second part has at least one recess; and wherein said holding means includes at least one projection extending into said recess.

10. The arrangement as defined in claim 5, wherein said support lever has a recess at said other end thereof; and wherein said retaining member has a portion received in said recess.

11. The arrangement as defined in claim 1, wherein said control lever is situated at one lateral region of said support lever; and further comprising an additional control lever substantially identical to said control lever and arranged at another lateral region of said support lever which is diametrically opposite to said one region.

12. The arrangement as defined in claim 11, wherein said control levers are in surface contact with said support lever.

13. The arrangement as defined in claim 1, wherein said retaining member has a non-circular tool-engagement recess on its portion facing outwardly of said housing upon insertion.

14. The arrangement as defined in claim 13, wherein said recess has a hexagonal cross section.

15. The arrangement as defined in claim 1, wherein said operating element has a recess which is open toward said opening for introduction of said one end of said support lever thereinto.

16. The arrangement as defined in claim 15, wherein said operating element has inclined inwardly converging surfaces at the open end of said recess for guiding said one end of said support lever into said recess.

17. The arrangement as defined in claim 1, wherein said booster piston has at least one recess which is open toward said opening for introduction of said first end portion of said control lever thereinto.

18. The arrangement as defined in claim 17, wherein said booster piston has inclined inwardly converging surfaces at the open end of said recess for guiding said first end portion of said control lever into said recess.

19. The arrangement as defined in claim 1, wherein said first and second end portions of said control lever are provided at the areas of engagement with said booster piston and with said valve member with formations which are substantially circular in cross section at least in planes parallel to the axes of said bores.

* * * * *